(12) United States Patent
Wittmers et al.

(10) Patent No.: US 11,338,237 B2
(45) Date of Patent: May 24, 2022

(54) HOLLOW FILTER ELEMENT, IN PARTICULAR FOR GAS FILTRATION

(71) Applicant: MANN+HUMMEL GmbH, Ludwigsburg (DE)

(72) Inventors: Christoph Wittmers, Bietigheim-Bissingen (DE); Nadine Donauer, Fellbach (DE); Andreas Franz, Ludwigsburg (DE); Marcel Holzwarth, Fayetteville, NC (US); Pedro Miguel Pereira Madeira, Bietigheim-Bissingen (DE); Joachim-Paul Krieger, Reisbach (DE); Martin Gruber, Gangkofen (DE); Manfred Winter, Bad Rappenau (DE); Torsten Fritzsching, Vaihingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 468 days.

(21) Appl. No.: 16/178,195

(22) Filed: Nov. 1, 2018

(65) Prior Publication Data
US 2019/0060816 A1 Feb. 28, 2019

Related U.S. Application Data

(63) Continuation of application No. PCT/EP2017/055294, filed on Mar. 7, 2017.

(30) Foreign Application Priority Data

May 3, 2016 (DE) .......................... 102016005353.4

(51) Int. Cl.
*B01D 46/24* (2006.01)
*B01D 46/00* (2022.01)
*F02M 35/024* (2006.01)

(52) U.S. Cl.
CPC ..... *B01D 46/2414* (2013.01); *B01D 46/0005* (2013.01); *B01D 46/0024* (2013.01);
(Continued)

(58) Field of Classification Search
CPC ............ B01D 46/2414; B01D 46/0005; B01D 2265/025; B01D 2275/208;
(Continued)

(56) References Cited

U.S. PATENT DOCUMENTS

2004/0035094 A1 2/2004 Jersey
2005/0194308 A1* 9/2005 Rohrmeier ............ B01D 29/111
210/490

(Continued)

FOREIGN PATENT DOCUMENTS

DE 202004020174 U1 3/2005
DE 102009050259 A1 5/2011
(Continued)

*Primary Examiner* — Robert Clemente
(74) *Attorney, Agent, or Firm* — James Hasselbeck

(57) ABSTRACT

A hollow filter element for insertion into an openable filter housing has a filter medium body configured as a hollow body surrounding an inwardly positioned flow space. At least one end disk is connected to the filter medium body and covers an axial end face of the filter medium body. A positioning element is arranged at the at least one end disk and interacts with a housing-associated blade of the filter housing. The positioning element receives the housing-associated blade with form fit in two different transverse directions relative to the longitudinal axis of the filter medium body. The positioning element has a positioning recess.

10 Claims, 4 Drawing Sheets

(52) U.S. Cl.
CPC . *F02M 35/02441* (2013.01); *B01D 2265/025* (2013.01); *B01D 2265/026* (2013.01); *B01D 2265/06* (2013.01); *B01D 2271/027* (2013.01); *B01D 2275/208* (2013.01)

(58) Field of Classification Search
CPC .......... B01D 2265/026; B01D 2265/06; B01D 2271/027; F02M 35/02441
See application file for complete search history.

(56) References Cited

U.S. PATENT DOCUMENTS

| | | | |
|---|---|---|---|
| 2009/0217632 A1 | 9/2009 | Coulonvaux | |
| 2010/0000414 A1* | 1/2010 | Williams | B01D 46/2414 |
| | | | 96/226 |
| 2014/0174296 A1* | 6/2014 | Schultz | A47L 5/365 |
| | | | 96/226 |
| 2015/0159600 A1* | 6/2015 | Waltenberg | B01D 46/2414 |
| | | | 55/501 |
| 2015/0167601 A1* | 6/2015 | Waltenberg | B01D 46/2414 |
| | | | 55/501 |
| 2018/0050296 A1* | 2/2018 | Fritzsching | B01D 46/2414 |

FOREIGN PATENT DOCUMENTS

| | | |
|---|---|---|
| DE | 102013013822 A1 | 2/2014 |
| DE | 102014006850 A1 | 12/2014 |
| DE | 102013015143 A1 | 3/2015 |
| DE | 102013017034 A1 | 4/2015 |
| DE | 102015004645 A1 | 10/2016 |
| EP | 1937961 B1 | 7/2008 |
| EP | 2488274 A2 | 4/2011 |
| WO | 2004039476 A1 | 5/2004 |
| WO | 2014202358 A1 | 12/2014 |
| WO | 2016082853 A1 | 6/2016 |

\* cited by examiner

HOLLOW FILTER ELEMENT, IN PARTICULAR FOR GAS FILTRATION

CROSS-REFERENCE TO RELATED APPLICATIONS

This application is a continuation application of international application No. PCT/EP2017/055294, having an international filing date of 7 Mar. 2017 and designating the United States, the international application claiming a priority date of 3 May 2016 based on prior filed German patent application No. 10 2016 005 353.4, the entire contents of the aforesaid international application and the aforesaid German patent application being incorporated herein by reference.

BACKGROUND OF THE INVENTION

The invention concerns a hollow filter element or annularly closed filter element, in particular for gas filtration, for example, for an air filter, for insertion into an openable filter housing. The hollow filter element comprises a filter medium body embodied as a hollow body and surrounding an inwardly positioned flow space; it further comprises at least one end disk that covers the filter medium body at an axial end face, wherein at the end disk a positioning element interacting with a housing-associated blade is arranged.

WO 2014/202358 A1 discloses a hollow filter element with elongate oval cross section shape whose filter medium body surrounds an inwardly positioned flow space. The hollow filter element is inserted into a receiving filter housing and is flowed through in radial direction from the exterior to the interior by the air to be cleaned. At an axial end face of the hollow filter element, there is a closed end disk; the purified fluid is axially discharged from the inwardly positioned flow space through the oppositely positioned end face.

The hollow filter element is inserted, lying on a longitudinal side, into the receiving filter housing. The filter medium body of the hollow filter element is embodied to taper conically so that the cross-sectional surface area tapers across the axial length of the hollow filter element. At the housing cover which is placed onto the filter housing, an inwardly positioned blade is integrally formed that, when the housing cover is attached, engages underneath a knob-shaped positioning element at the end face of the hollow filter element and lifts the hollow filter element at this end face. The positioning element projects radially past the outer contour of the filter medium body.

SUMMARY OF THE INVENTION

The invention concerns the object of configuring with simple constructive measures a hollow filter element in such a way that a safe assembly and reception in a filter housing are ensured.

This object is solved according to the invention in that the positioning element is embodied for form-fit reception of the blade in two different transverse directions and in that a positioning recess is provided in the positioning element. The dependent claims provide expedient further embodiments.

The hollow filter element according to the invention is preferably used for gas filtration, for example, as an air filter for filtration of combustion air to be supplied to an internal combustion engine, for example, in trucks. The hollow filter element comprises a filter medium body that is embodied as a hollow body and at which the filtration of the fluid to be cleaned takes place. At least at one axial end face the filter medium body is covered by an end disk that preferably closes off flow-tightly the inwardly positioned flow space in the filter medium body. At the oppositely positioned axial end face, an end disk can be arranged also which extends at least across the region of the filter medium body wherein optionally a flow opening of the end disk remains free so that fluid can be exchanged between the inwardly positioned flow space and the environment. The flow through the filter medium body is realized preferably in radial direction, in particular radially from the exterior to the interior, so that the inwardly positioned flow space forms the clean side from which the purified fluid is discharged axially. The filter medium body in principle can have any cross section shape, for example, circular, oval, or a shaped like a stadium.

At one end disk, a positioning element is provided that, upon closing the housing cover and in the installed state of the filter element, interacts with a housing-associated blade that supports the filter element at the positioning element. When inserting the filter element into the filter housing or when placing and closing the housing cover, the housing-associated blade contacts the positioning element, lifts optionally the filter element for reaching its final installation position, and supports the filter element. According to the invention, a positioning recess is provided in the positioning element.

In order to ensure a correctly positioned seat of the filter element in the filter housing, the positioning element is configured at the end disk of the hollow filter element in such a way that a form-fit reception of the blade in or at the positioning element is ensured in two different transverse or radial directions, relative to the longitudinal axis of the filter element. Accordingly, between the housing-associated blade and the positioning element at the hollow filter element, a form-fit connection exists in both transverse directions which define the plane of the end disk and both extend radially relative to the longitudinal axis of the hollow filter element.

When in installation position the hollow filter element assumes, for example, a horizontal position in which the longitudinal axis of the hollow filter element extends orthogonally to the weight force vector, a position-precise securing action of the hollow filter element in vertical direction as well as in transverse direction can be achieved by the connection between the filter element-associated positioning element and the housing-associated blade.

The positioning element is advantageously formed as one piece together with the end disk. The latter is comprised, for example, of polyurethane so that also the positioning element is made of this material. However, other materials for the end disk and the positioning element are also conceivable, for example, plastic material or metal. Moreover, it is possible that the end disk and the positioning element are manufactured of different materials but that the positioning element is fixedly arranged at the end disk.

According to a further expedient embodiment, the positioning element projects radially past the end disk. The positioning element can additionally or alternatively project also in axial direction past the rim region of the end disk. In case of axially and/or radially projecting arrangement of the positioning element at the end disk, the positioning element can be engaged in a simplified way by the housing-associated blade and the hollow filter element can be fixed in the desired way.

The housing-associated blade projects into the positioning recess in the mounted position. In this way, the form-fit reception of the blade in the positioning element in two different transverse directions is reliably ensured. The positioning recess is embodied either closed circumferentially or embodied open at the rim and, for example, U-shaped. The embodiment open at the rim has the advantage that the blade can be inserted into the positioning recess in radial direction. In case of the circumferentially closed positioning recess, the blade is inserted in axial direction into the positioning recess.

According to a further expedient embodiment, the hollow filter element comprises an oval or approximately oval cross section shape. It may be expedient, for example, to configure the cross section shape of the hollow filter element as an elongate oval that comprises longitudinal sides that are embodied relatively long and narrow sides that are embodied relatively short. In case of an oval or approximately oval cross section shape, the positioning element is advantageously positioned at a longitudinal side. In particular, it is expedient for the horizontal installation situation of the hollow filter element in the receiving filter housing to arrange the positioning element at the bottom longitudinal side, in particular centrally, at the hollow filter element. An arrangement at a narrow side is in particular advantageous in case of an upright installation situation.

Inasmuch as the positioning element is provided with a positioning recess, the latter projects preferably past the rim region of the hollow filter element so that the housing-associated blade can move without impairment into the positioning recess.

According to yet another expedient embodiment, the hollow filter element is conically shaped in axial direction. Accordingly, the hollow filter element comprises a differently sized cross-sectional surface area at its two axially opposite end faces. For example, it can be expedient that the hollow filter element tapers toward the axial end face at which the positioning element is arranged. The cone angle lies, for example, in an angle range of up to maximally 10° or up to maximally 5°. In an alternative embodiment, the hollow filter element is cylindrically embodied.

It can furthermore be expedient to arrange one or a plurality of additional adjusting elements at the end disk at which the positioning element is located. For example, it is advantageous to arrange centrally at the closed end disk, with circumferential spacing to the rim region, a central adjusting element with which a housing-associated counter adjusting element interacts in the installation position. In addition or alternatively, at the rim region of the end disk, projecting adjusting elements can be arranged in the form of one or a plurality of cams which are supported at the inner housing wall of the receiving filter housing in the installation position.

The blade which interacts with the positioning element with form fit is located advantageously at the housing cover which can be placed onto a pot-shaped component of the filter housing. The blade can optionally be provided with an insertion ramp which facilitates threading into the positioning recess of the positioning element and lifting of the hollow filter element.

BRIEF DESCRIPTION OF THE DRAWINGS

Further advantages and expedient embodiments can be taken from the further claims, the figure description, and the drawings.

In the Figures same components are provided with same reference characters.

DESCRIPTION OF PREFERRED EMBODIMENTS

Figure 1:
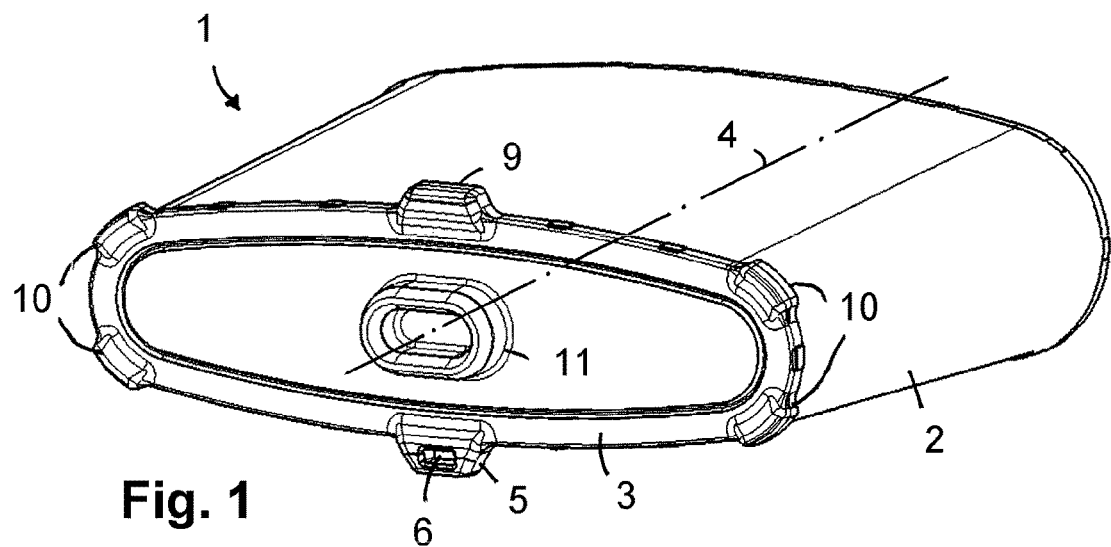
FIG. 1 shows a perspective view of an oval hollow filter element, with a positioning element in the rim region of an end-face end disk, wherein the positioning element is provided with a positioning recess that is circumferentially closed.
Figure 2:
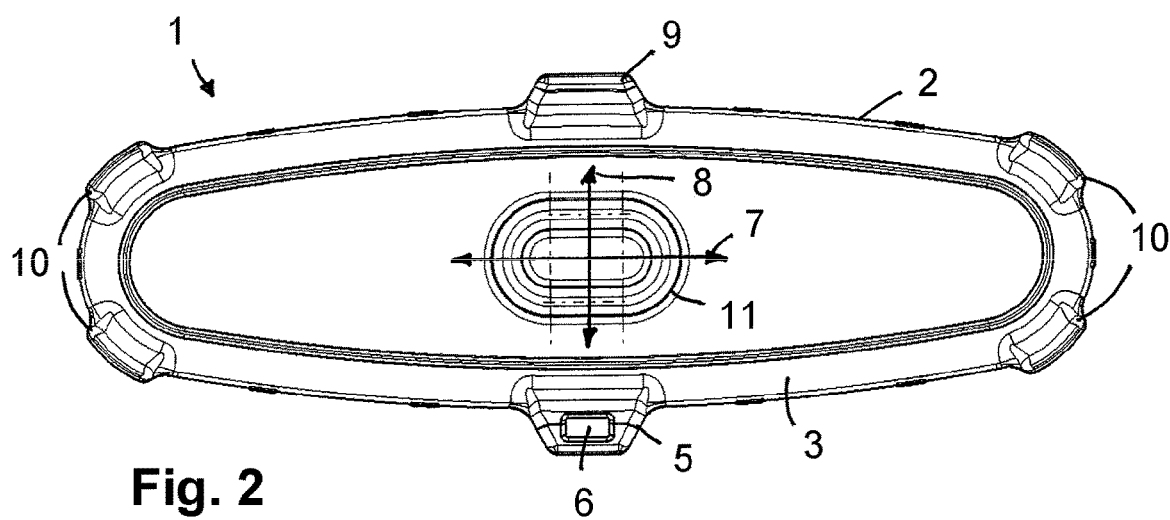
FIG. 2 shows a plan view of the axial end face of the hollow filter element.

In FIGS. 1 and 2, a first embodiment of a hollow filter element 1 is illustrated which is used for gas filtration, in particular for air filtration in internal combustion engines, preferably for trucks. The hollow filter element 1 comprises a filter medium body 2 which is configured as a hollow body and surrounds an inwardly positioned flow space. The filter element comprises a greatly ovalized cross section shape wherein, in comparison to an actual oval, the longitudinal sides have a smaller curvature and the narrow sides a greater curvature. The hollow filter element 1 whose longitudinal axis between the axial end faces is identified at 4 is radially flowed through from the exterior to the interior by the air to be purified so that the inwardly positioned flow space forms the clean side. The purified air is subsequently discharged through an axial end face of the hollow filter element.

The further axial end face of the hollow filter element 1 is closed off by a continuous end disk 3 which extends in the region of the end face of the filter medium body 2 as well as of the enclosed inwardly positioned flow space. The plane of the end disk 3 is orthogonal to the longitudinal axis 4. The end disk 3 is, for example, manufactured of polyurethane (PUR) and can be injection molded or cast onto the hollow filter element 1.

The hollow filter element 1 comprises in axial direction—relative to the longitudinal axis 4—a cone shape. At the end disk 3 which is of a closed configuration and closes off the inwardly positioned flow space, the hollow filter element 1 has a smaller cross-sectional surface area than at the oppositely positioned axial end face.

At the end disk 3, a positioning element 5 is integrally formed which is located in the rim region of the end disk 3 at a longitudinal side and projects radially and axially past the outer contour of the hollow filter element. The positioning element 5 is embodied as one piece together with the end disk 3. A positioning recess 6 which is circumferentially closed is provided in the positioning element 5. The positioning recess 6 is located radially outside of the outer contour of the hollow filter element 1 and serves for receiving a housing-associated blade for fixation in both radial and transverse directions 7 and 8 relative to the longitudinal axis 4. When the housing-associated blade engages the positioning recess 6, a form-fit connection between blade and positioning element 5 in the two transverse directions 7 and 8 is achieved. A possibly existing clearance with which the hollow filter element 1 is inserted into the filter housing can be eliminated and the hollow filter element can be fixed in the filter housing in this way. The housing-associated blade is inserted axially into the circumferentially closed positioning recess 6.

In the region of the outer circumference, three additional positioning or adjusting elements 9, 10 are integrally formed at the end disk and project axially and radially past the contour of the hollow filter element 1. A first adjusting element 9 in the form of a cam is located at the longitudinal side that is opposite the positioning element 5 and is also arranged, like the positioning element 5, at the center of the longitudinal side. Two adjusting elements 10 are located at each narrow side, respectively. In the installation position, the adjusting elements 9 and 10 support the hollow filter element 1 at the inner wall of the receiving filter housing or of the housing cover.

A further adjusting element 11 is located centrally at the end face and, like the other adjusting elements, is also formed as one piece together with the end disk 3. The central adjusting element 11 comprises a depression which is engaged by a corresponding counter adjusting element at the housing cover in the installation position.

Figure 3:
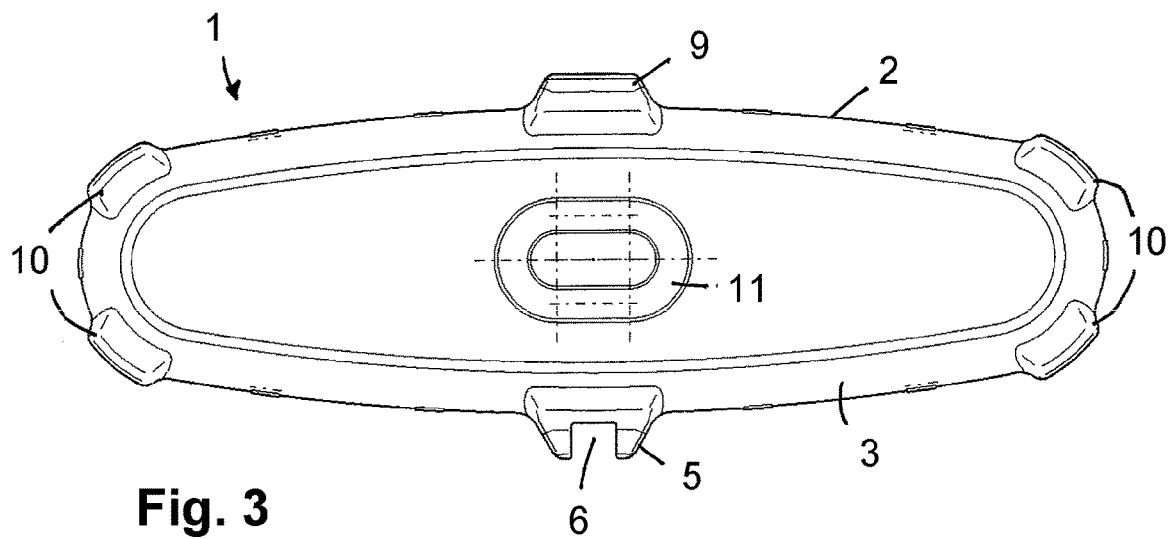
FIG. 3 shows a hollow filter element in a further embodiment in which the rim-associated positioning element comprises an open positioning recess.

In FIG. 3, a further embodiment of a hollow filter element 1 is illustrated which is in principle of the same configuration as the hollow filter element of FIG. 1 or 2. However, the difference in FIG. 3 is the configuration of the positioning element 5 that comprises a positioning recess 6 open at the rim which has a U-shaped cross section and is open radially outwardly. This makes it possible to insert the housing-associated blade in radial direction into the recess 6. The fixation is realized, as in the first embodiment, in both transverse or radial directions.

Figure 4:
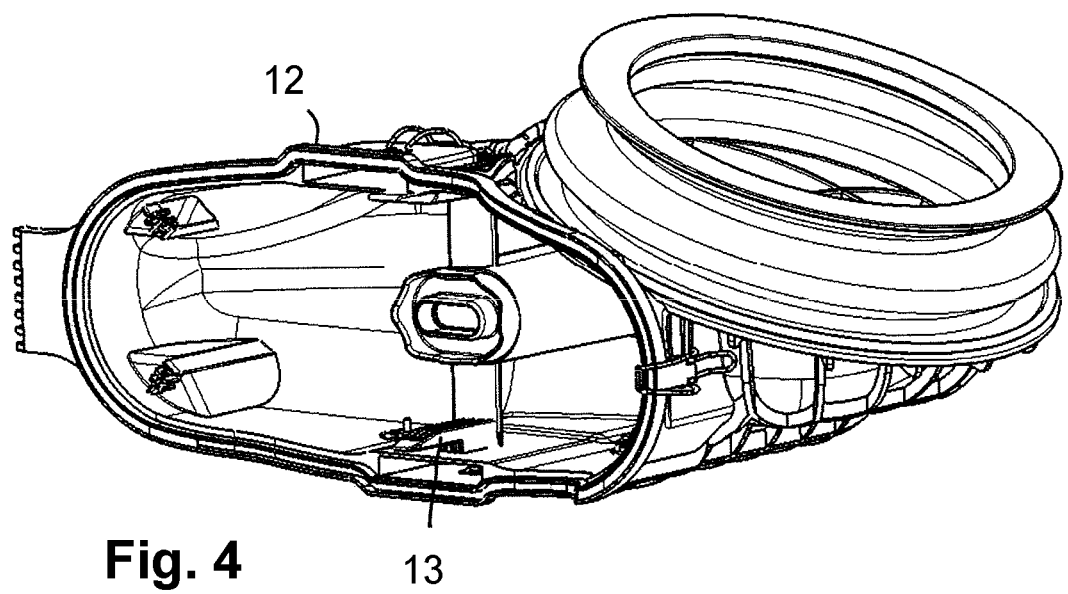
FIG. 4 shows in perspective view a housing cover with a blade arranged at the inner cover side and projecting into the positioning recess of the positioning element in the installation position.
Figure 5:
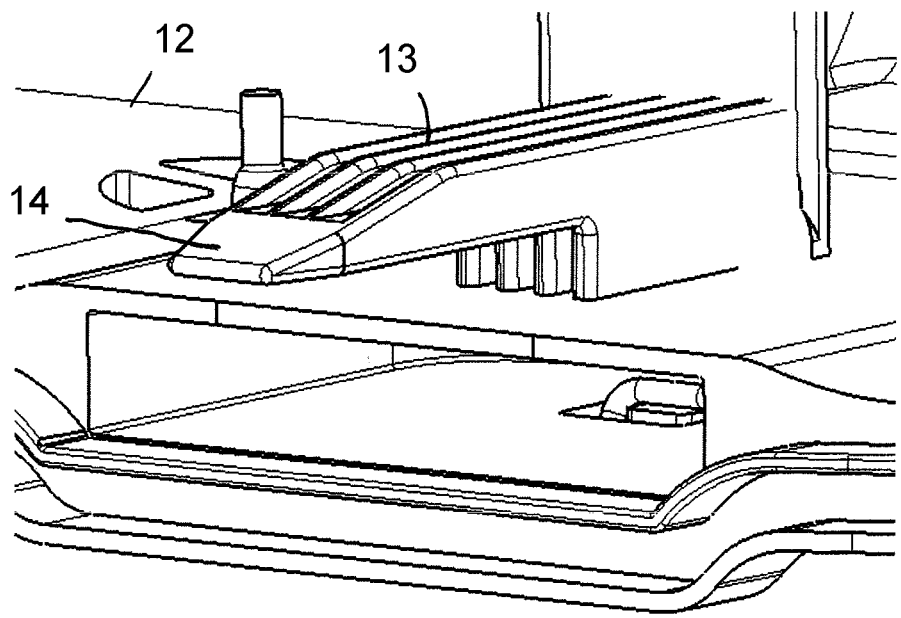
FIG. 5 shows the blade in enlarged illustration.

In FIGS. 4 and 5, a housing cover 12 is illustrated which can be placed onto a filter housing for receiving the hollow filter element. At the inner wall of the housing cover 12, a blade 13 is provided which axially extends toward the open side of the housing cover but is arranged completely inside the housing cover 12. The enlarged illustration according to FIG. 5 shows that the tip of the blade 13 is provided with an insertion ramp 14 flattened at the top side which facilitates insertion into the positioning recess 6 at the positioning element 5. Also, upon insertion into the positioning recess 6, lifting of the hollow filter element 1 within the receiving filter housing is achieved at the same time, whereby the oppositely positioned cam-shaped adjusting element 9 is pushed against the inner housing wall.

Figure 6:
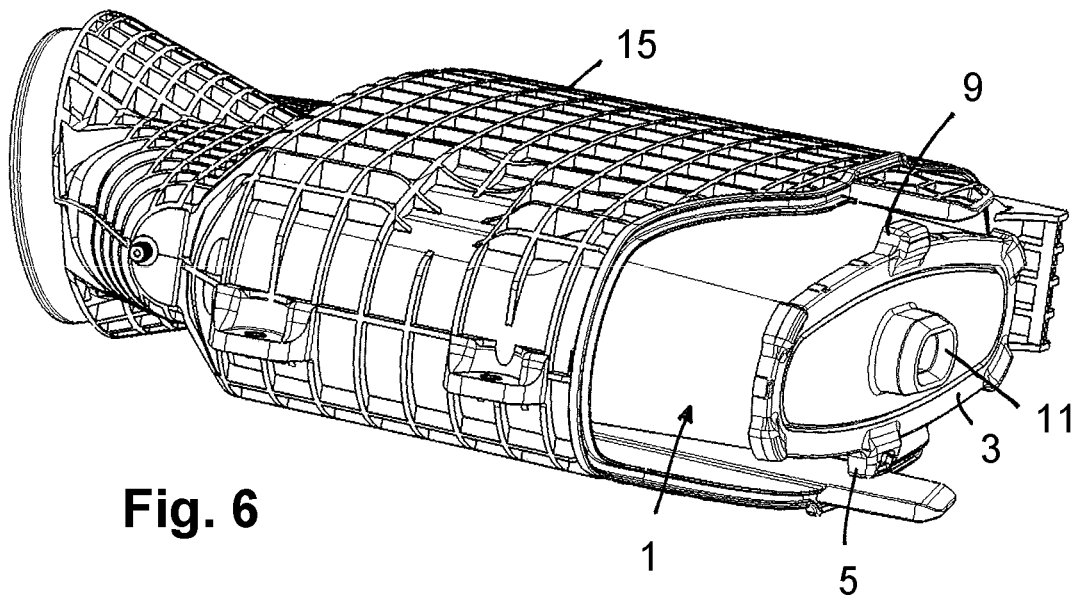
FIG. 6 shows a filter device with a filter housing and the inserted hollow filter element of FIG. 1 or 2.
Figure 7:
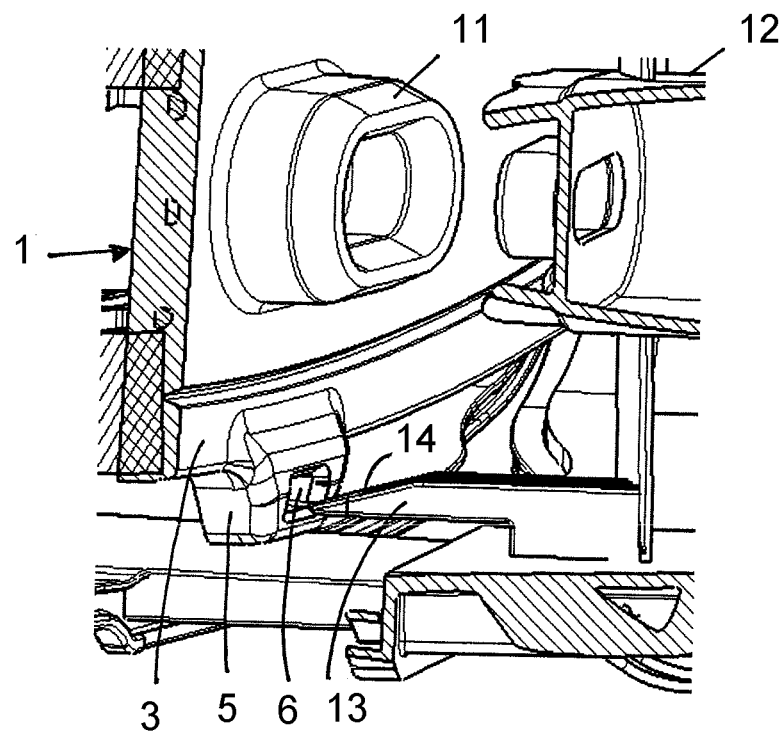
FIG. 7 shows an enlarged view of the end face of the hollow filter element with approaching housing cover.

In FIG. 6, the hollow filter element 1 is illustrated in the receiving filter housing 15. The housing cover 12 is to be placed onto the filter housing 15. As the housing cover 12 approaches the hollow filter element 1 (FIG. 7), the tip of the blade 13 arranged in the housing cover 12 engages the positioning recess 6 in the positioning element 5 and can extend to the bottom side of the hollow filter element 1. The insertion ramp 14 at the top side of the tip of the blade 13 lifts in this context the entire hollow filter element 1 in upward direction.

Figure 8:
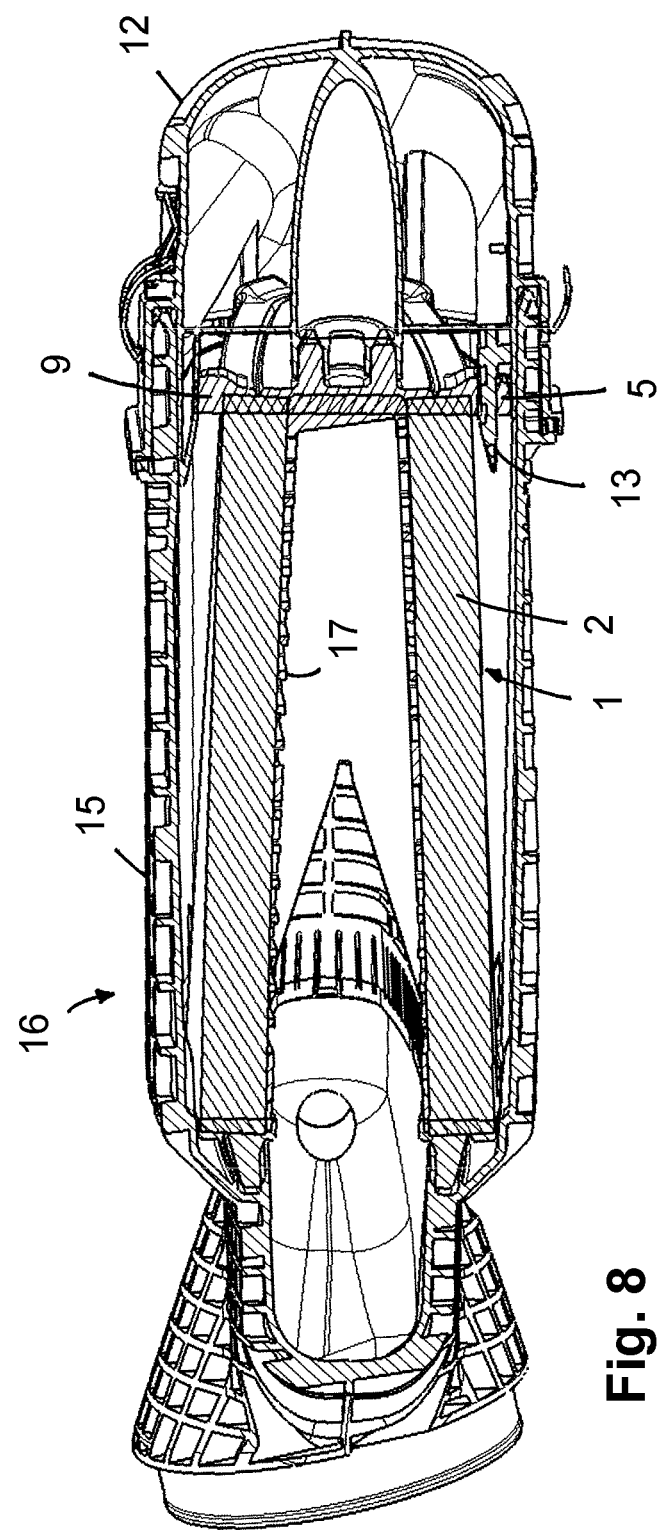
FIG. 8 shows a longitudinal section through the filter device with attached housing cover, wherein the blade at the inner cover side projects into the positioning recess of the positioning element.

In FIG. 8, the filter device 16 is shown in section view. The filter device 16 comprises the filter housing 15 with attached housing cover 12 and the hollow filter element 1 inserted into the filter housing 15. One can also see that the filter medium body 2 is lined at its inner side with a support frame 17 that forms at the same time the limiting wall of the inwardly positioned flow space. The discharge of the purified fluid from the inwardly positioned flow space is realized axially through the side opposite the housing cover 12 where the hollow filter element 1 is provided with an end disk which however covers only the filter medium body 2 and is embodied open in the region of the inwardly positioned flow space.

The blade 13 projects into the positioning recess of the positioning element 5 and lifts the hollow filter element 1 so far that the cam-shaped adjusting element 9 at the top is pressed against the inner wall of the filter housing.

What is claimed is:

1. A hollow filter element for insertion into an openable filter housing, the hollow filter element comprising:
    a filter medium body embodied as a hollow body surrounding an inwardly positioned flow space and comprising a longitudinal axis;
    at least one end disk connected to and covering an axial end face of the filter medium body;
    a positioning element arranged at the at least one end disk and configured to interact with a housing-associated blade of the filter housing;
    wherein the positioning element is configured to receive the housing-associated blade with form fit in two different transverse directions relative to the longitudinal axis of the filter medium body;
    wherein the positioning element comprises
        a positioning recess;
    wherein the hollow filter element comprises an at least approximately oval cross section shape;
    wherein the positioning element is arranged at a longitudinal side of the oval cross section shape.

2. The hollow filter element according to claim 1, wherein the positioning element projects past the at least one end disk in a radial direction relative to the longitudinal axis of the filter medium body.

3. The hollow filter element according to claim 1, wherein the positioning element projects past a rim region of the at least one end disk in an axial direction relative to the longitudinal axis of the filter medium body.

4. The hollow filter element according to claim 1, wherein the positioning recess is a circumferentially closed positioning recess.

5. The hollow filter element according to claim 1, wherein the positioning recess is open at a rim of the positioning element.

6. The hollow filter element according to claim 1, wherein the positioning element is formed as one piece together with the at least one end disk.

7. The hollow filter element according to claim 1, wherein the hollow filter element is conical along the longitudinal axis of the filter medium body.

8. A filter device comprising:
    a filter housing comprising a housing-associated blade;
    a hollow filter element comprising
        a filter medium body embodied as a hollow body surrounding an inwardly positioned flow space and comprising a longitudinal axis;
        further comprising at least one end disk connected to and covering an axial end face of the filter medium body; and
        further comprising a positioning element arranged at the at least one end disk,
        wherein the positioning element comprises
            a positioning recess and is configured to interact with the housing-associated blade;

wherein the hollow filter element comprises an at least approximately oval cross section shape; and wherein the positioning element is arranged at a longitudinal side of the oval cross section shape;

wherein the housing-associated blade projects into the positioning element and engages the positioning element with form fit in two different transverse directions relative to the longitudinal axis of the filter medium body.

9. The filter device according to claim 8, wherein the housing-associated blade comprises an insertion ramp configured to facilitate insertion into the positioning element and configured to lift the hollow filter element.

10. The filter device according to claim 8, wherein the blade is arranged at a housing cover of the filter housing.

\* \* \* \* \*